(12) United States Patent
Duffin et al.

(10) Patent No.: US 8,942,549 B2
(45) Date of Patent: Jan. 27, 2015

(54) RESUME POINT FOR DIGITAL MEDIA PLAYBACK

(75) Inventors: Todd E. Duffin, Bellevue, WA (US); Todd R. Malsbary, Seattle, WA (US)

(73) Assignee: Media IP, LLC, Seattle, WA (US)

( * ) Notice: Subject to any disclaimer, the term of this patent is extended or adjusted under 35 U.S.C. 154(b) by 118 days.

(21) Appl. No.: 12/906,949

(22) Filed: Oct. 18, 2010

(65) Prior Publication Data

US 2011/0091187 A1   Apr. 21, 2011

Related U.S. Application Data

(60) Provisional application No. 61/253,777, filed on Oct. 21, 2009.

(51) Int. Cl.
  *H04N 5/783*   (2006.01)
(52) U.S. Cl.
  CPC .................................... *H04N 5/783* (2013.01)
  USPC ....................................................... 386/349
(58) Field of Classification Search
  CPC ................................................... H04N 5/783
  USPC ....................................................... 386/349
  See application file for complete search history.

(56) References Cited

U.S. PATENT DOCUMENTS

| | | | |
|---|---|---|---|
| 6,697,944 B1 | 2/2004 | Jones et al. | |
| 6,859,791 B1 | 2/2005 | Spagna et al. | |
| 7,779,064 B2 | 8/2010 | Phillips | |
| 2003/0220835 A1 | 11/2003 | Barnes, Jr. | |
| 2004/0010601 A1 | 1/2004 | Afergan et al. | |
| 2005/0044280 A1 | 2/2005 | Reisman | |
| 2006/0156355 A1* | 7/2006 | Kawasaki et al. ................ 725/88 |
| 2006/0239650 A1* | 10/2006 | Heredia et al. ................... 386/95 |
| 2008/0075437 A1* | 3/2008 | Hamada et al. ................ 386/126 |
| 2008/0133546 A1 | 6/2008 | Phillips | |
| 2008/0228300 A1* | 9/2008 | Tagawa et al. .................. 700/94 |
| 2008/0271154 A1 | 10/2008 | Kamada et al. | |
| 2009/0164709 A1 | 6/2009 | Lee et al. | |
| 2009/0282454 A1 | 11/2009 | Ekstrand | |
| 2009/0313432 A1* | 12/2009 | Spence et al. .................. 711/115 |
| 2010/0023689 A1* | 1/2010 | Kim .............................. 711/115 |
| 2010/0262912 A1 | 10/2010 | Cha | |
| 2010/0293581 A1* | 11/2010 | Robert ............................ 725/74 |
| 2011/0093622 A1 | 4/2011 | Hahn et al. | |
| 2011/0197131 A1 | 8/2011 | Duffin et al. | |

(Continued)

OTHER PUBLICATIONS

Young; International Search Report for PCT/US07/22007; mailed May 5, 2008; 1 page.

*Primary Examiner* — Thai Tran
*Assistant Examiner* — William Tran
(74) *Attorney, Agent, or Firm* — Lowe Graham Jones PLLC; Ellen M. Bierman

(57) ABSTRACT

A system (and method and computer readable medium) are disclosed for configuring a digital media device to resume playback of content stopped at a first digital media playback device to resume at a second digital media playback device. The configuration detects a stop in play of content stored on a digital media storage device and determines digital media playback preference selections for the content played on the first digital media playback device. The configuration generates a playback preference file and determines a stop location for content, the stop location corresponding to a resume point for the content on the second media playback device. The configuration writes the playback preference file and the stop location to the digital media storage device.

16 Claims, 2 Drawing Sheets

(56) References Cited

U.S. PATENT DOCUMENTS

| | | |
|---|---|---|
| 2012/0124390 A1 | 5/2012 | Zipperer et al. |
| 2012/0254629 A1 | 10/2012 | Zipperer et al. |
| 2012/0315019 A1 | 12/2012 | Zipperer et al. |
| 2012/0324244 A1 | 12/2012 | Zipperer et al. |

* cited by examiner

RESUME POINT FOR DIGITAL MEDIA PLAYBACK

CROSS REFERENCE TO RELATED APPLICATIONS

This application claims the benefit of U.S. Provisional Application No. 61/253,777, filed Oct. 21, 2009, titled "Resume Point for Digital Media Playback," the contents of which is incorporated by reference in its entirety.

BACKGROUND

1. Field of Art

The disclosure generally relates to the field of digital media playback.

2. Description of Art

Conventionally, digital video media, for example, DVD or digital video disks, can be started, stopped, and resumed from the location where the digital media was stopped from within a same digital video player. However, if the digital video disk is removed from the digital video player and inserted into a second digital video player playback does not resume from where the content was last played; rather, it returns to the beginning point.

Further, when playing digital video in a digital video device, a user may set preferences with respect to how that digital video disk may be played. For example, language options and closed caption options may be set. If the digital video disk is removed and placed in another digital video player for playback these preferences can also be used in this other digital video player.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
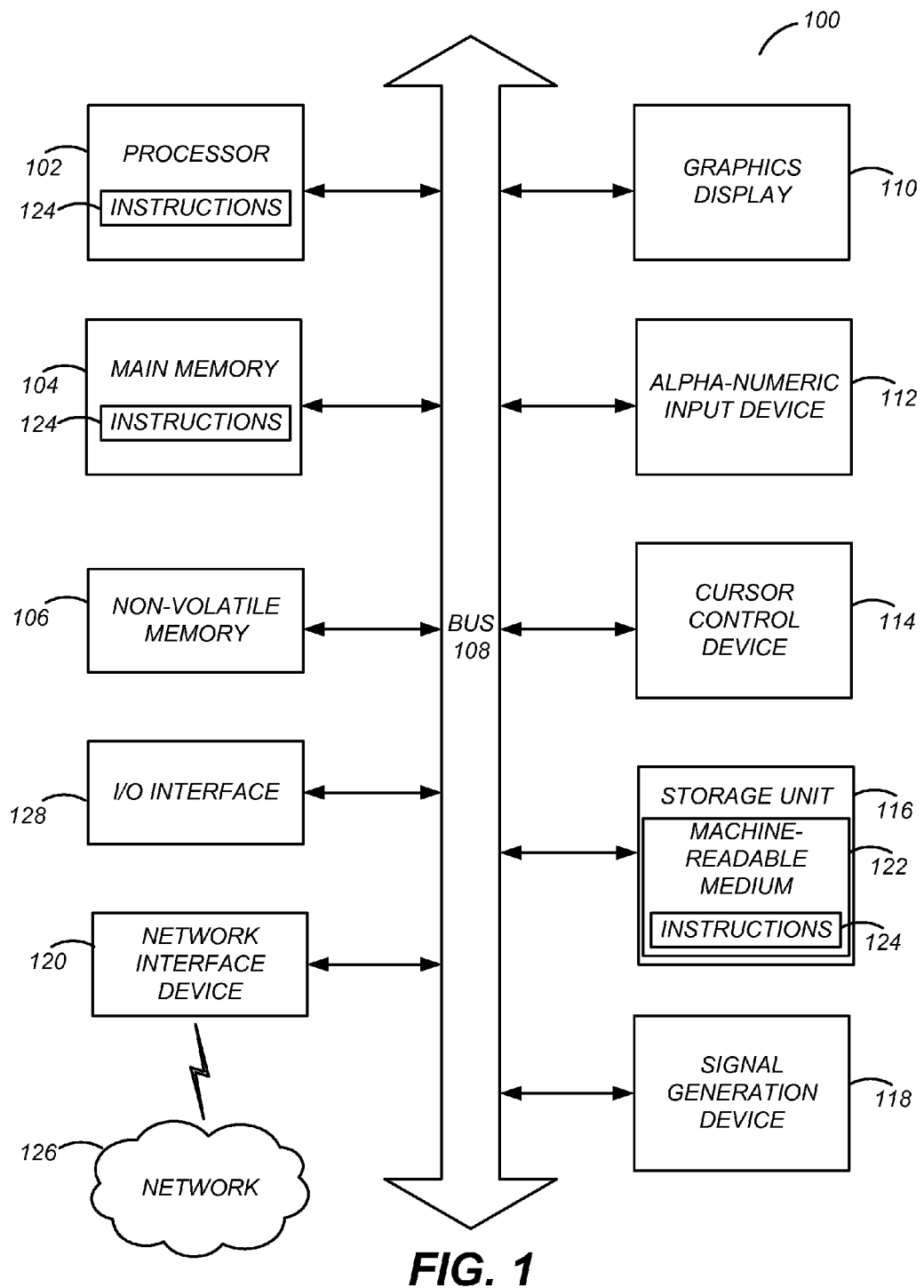
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes a configuration for execution within a first digital media playback device, a process for structuring a digital media storage device to resume playback of content stopped on the first digital media playback device on a second digital media playback device. The configuration includes detecting a stop in play of content stored on a digital media storage device and determining digital media playback preference selections for the content played on the first digital media playback device. It also includes generating a playback preference file and determining a stop location for content, the stop location corresponding to a resume point for the content on the second media playback device. The configuration further includes writing the playback preference file and the stop location to the digital media storage device.

It is noted that content includes in one embodiment distributed content (e.g., commercial or noncommercial) and distribution may include preferences linked with that content as described herein. In addition, generating the playback preference file can include either creating a new playback preference file or updating a previously created playback preference file. As for writing the playback preference file, what is written includes content specific parameters such as language and subtitles, as well as system specific parameters such as screen format and audio format. In addition, the digital media storage device (or "media device") may be on a network, e.g., network storage, or on a portable physical storage device, e.g., flash memory storage device, such as secured flash memory storage device (e.g., a secure digital (SD) card or universal memory bus (USB) thumb-drive).

For ease of discussion, the concepts noted herein are described in the context of the portable physical storage device. The storage device can be internal to a computer device or external to the computing device. In addition, the principles noted herein also apply to networked storage locations, such as a network drive and/or directory or a virtual disk, in terms of storage and retrieval of files and data as noted herein.

Computing Machine Architecture

FIG. 1 is a block diagram illustrating components of an example machine able to read instructions from a machine-readable (and writeable) medium and execute them in a processor (or controller). Specifically, FIG. 1 shows a diagrammatic representation of a machine in the example form of a playback computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a portable media player, a game device, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example playback computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, a non-volatile memory 106, and a graphics display 110 (including configuration for display of video) which are configured to communicate with each other via a bus 108. The playback computer system 100 may also include an alphanumeric or button structural components 112 (e.g., for a keyboard or keypad), a cursor control structural components 114 (e.g., for a mouse, a trackball, a joystick, a motion sensor, a remote control, or other pointing instrument), a storage unit 116, a signal generation structural components 118 (e.g., for a speaker), an input/output (I/O) interface 128 and a network interface device 820, which also are configured to communicate via the bus 108. It is noted that the I/O interface 128 includes a structure to interface with a flash media storage device. For example, the I/O interface 128 may include a universal serial bus (USB) interface to couple (physically and/or communicatively) with a USB configured flash memory drive or solid state drive. Alternately, or in addition, the I/O interface 128 may include an SD reader to communicatively couple with an SD card. It is noted that the SD card structural configuration (e.g., form factor, pin connections) is defined through the SD Card Association. In addition, the I/O interface can be a USB interface configured to receive a USB connection, in which the USB connection couples with additional circuitry for SD conversion.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Playback Configuration

Figure 2:
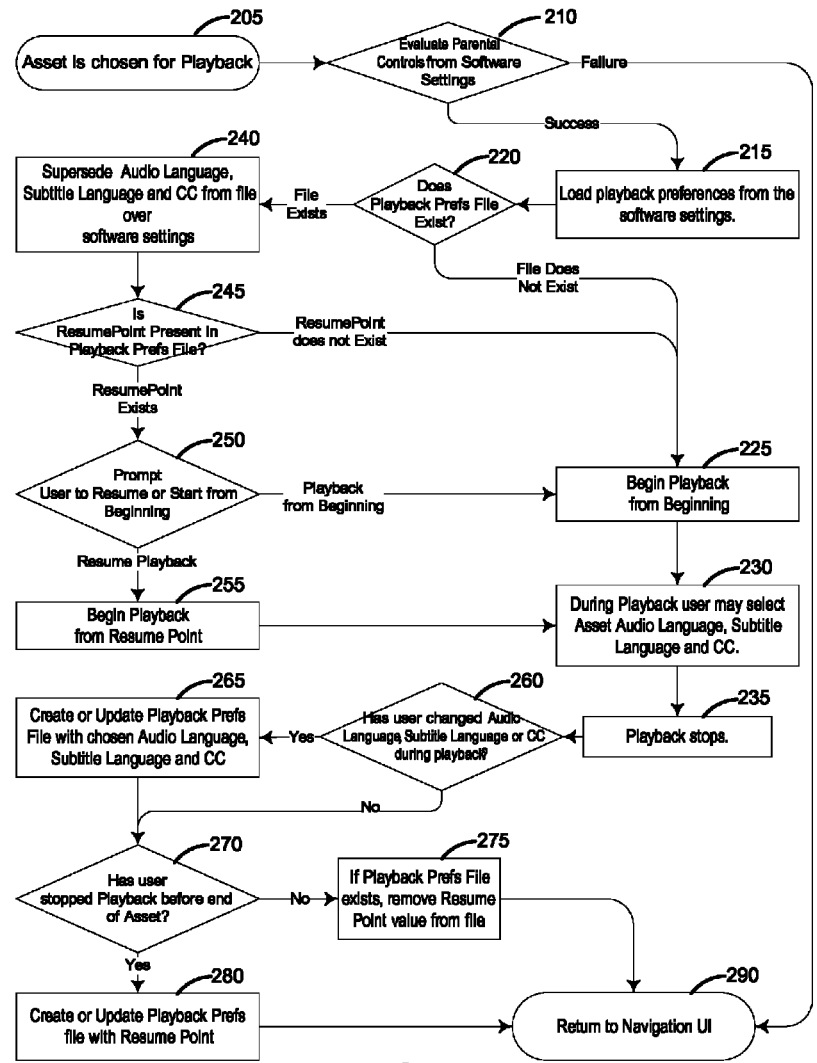
FIG. 2 illustrates one embodiment of a playback configuration.

Referring now to FIG. 2, illustrated is one embodiment of a playback configuration. The playback configuration may be structured as a process executed by a playback system, for example, in this example through the playback computer system 100. The process may be configured as software or hardware modules that describe particular functionality as further described herein.

The process starts when a particular asset (a media device with content (e.g., movie, television program) for viewing stored thereon) is selected (or chosen) 205 for playback through the playback computer system 100. It is noted that the content also may be referenced as an "asset" in the context that it may be copyrighted and licensed for appropriate playback. The selection may be through a navigation user interface (UI) that the playback computer system 100 displays on a screen.

The process optionally determines and evaluates 201 whether parental controls from the software settings are active and required, e.g., password (or other pass code) to play assets corresponding to particular ratings. If the optional controls are set and an incorrect code is provided to continue, the process fails and returns back to the original navigation user interface 290. If the optional parent control is successfully addressed, e.g., proper pass code, the process continues.

The process continues and loads 215 playback settings from a software setting file of the playback computer system 100. The software settings typically are set to default value for the playback computer system 100, e.g., English audio language, no subtitles, and no closed caption. However, the configuration as described herein can supersede these setting for the particular media device (e.g., the SD card or USB memory stick) that communicatively couples with the playback computer system 100. In one embodiment, supersede files are stored on the media device (e.g., the SD card or USB thumb drive) in a file corresponding to what the playback preferences are for the content on the media device (a playback preferences (or prefs) file). Hence, the system determines 220 if the playback preferences file exists. If no preferences file exists, playback begins 225 from the beginning During playback the user may select 230 settings that the user may prefer relating to the content. These settings are playback preferences and may include, for example, audio language, subtitle presentation and language, and closed captioning features.

In alternate embodiments, they may also include system related settings such as screen format (e.g., wide screen, standard screen) and audio (or sound) format (e.g., surround sound, stereo, mono). Still other embodiments may also prompt a user to provide details of the device whether playback will resume and provide functionality on the playback computing system 100 to prepare the content accordingly, e.g., upscaling the video for playback.

When playback stops 235 on the playback computer system 100, the process determines if the user has changed 260 playback preferences. If so, the process creates 265 and a playback preferences file that includes the playback preferences for the content stored on the media device and stores that file on the media device having the content. If the preferences file already exists on the media device, it is updated 265 with any playback preferences set by the user. Once the playback preferences file is created or updated, or if no playback preferences were ever made or changed, the process determines 270 whether the user stopped playback of the content before it ended. If the content has not ended, the process creates or updates 280 the playback preferences file with the resume point value for the content (e.g., a time marker within the movie or a chapter marker). The process then returns 290 to the navigation user interface. If the content has reached the end the process removes 275 the resume point value from the playback preferences file and returns 290 to the navigation user interface.

Assume now that the media device is no longer played at the playback computing system 100 it was just playing in and instead is communicatively coupled to play in a different playback computing system. This second playback computing system is configured to also include software for playback similar to the original playback computing system, e.g., 100, and thus is functionally similar in the context of playing back the media device. Hence, the second computing playback device would have the asset selected 205, evaluated for parental control 210 and been approved and initial playback settings of the second playback computing system and loaded 215.

The process now reads the media device and determines 220 that the playback preferences file exists on the media device. Accordingly, the process supersedes 240 the software settings on the second playback computer system with the settings retrieved from the playback preferences file. The process determines 245 whether a resume point is present in the playback preferences file. The resume point would correspond to where playback was stopped on the other playback computing system. If a resume point is not present, playback occurs from the beginning 225 of the content.

If a resume point exists in playback preferences file, the playback can start from the resume point 255. Optionally, the process can be configured to prompt 250 the user to select between resuming from where the content was stopped or revert back to the beginning of the content (or elsewhere based on selections a user can make, e.g., through a chapter menu). If beginning is selected, the process starts playback from the beginning 225. If resume is selected, playback starts from the resume point 255. The user may leave the playback preferences or during playback change the playback preferences 230 as noted above. In addition, as with the first playback computing system, playback through the second playback computing system may be stopped 235 and the process for saving playback preferences and resume points may be again as noted above with the first playback computing system.

It is noted that in addition to configuring the second playback computing device with the language, subtitle, and closed caption settings from the playback preferences file, other parameters such as screen format (e.g., wide screen, standard screen) and audio (or sound) format (e.g., surround sound, stereo, mono), may also be stored and in playback preferences file and applied at the second playback computing device. However, in some configurations there may be a difference of physical components corresponding to the first and the second playback computing devices. Hence, in those instances configurations that cannot be set on the second playback computing device, are not retrieved for overwriting and rather remain (or default) to what that second playback computing device is configured to playback (i.e., is capable of providing for playback).

The disclosed configuration allows for transferability of preferences for content from a first playback computing system to a second playback computing system without having to manually set the second playback system to match the first playback computing system. By recording and storing the preferences from the first playback computing system directly to the media device and then having the media device transfer those settings to the second playback computing system, the second playback computing system can replicate playback of the first playback system (e.g., automatically), including resuming playback from where it was stopped on the first playback computing system. This simplifies ease of use of playback systems and enhances portability value of content on the media device.

Additional Configuration Considerations

The configuration noted above may also store other preferences. For example, the configuration may store additional preferences on the media device (e.g., SD Card, USB drive, or network drive or file) that are to be transferred with the content from the first media playback computing system to the second playback computing system. For example, the resume point for digital media playback may include in the playback preferences file chapter start time from a metadata file, e.g., in XML format, which contains non-image metadata related to the content (or asset; stored in file MD.GPV). The chapter start time is the time a chapter starts measured from the beginning of the content in seconds and fractions of a second. Other data that may be stored includes chapter image files, which is the thumbnail image of each of the content chapters in image file format (e.g., JPG format). These and other information for transfer from the first media playback computing system to the second media playback computing system, e.g., a list of audio languages available in the content, a list of audio channels available in the content, a display of closed caption (CC) if available in the content, and subtitles language available in the content, allows for maintaining a user experience relative to the content without have to re-set features on the subsequent system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, the process of FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for storing preferences and resume point for content played on a first playback computing system to maintain those preferences and resume playback at a second playback computing system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method executable in a first digital media playback device for configuring a digital media storage device to resume playback of video content stopped on the first digital media playback device on a second digital media playback device, the method comprising:
   detecting a stop in play of the video content stored on a writeable, portable digital media storage device;
   determining digital media playback preference selections for the video content played on the first digital media playback device, the first media playback device separate and distinct from the second media playback device, the digital media playback preference selections including at least one of audio language, subtitle presentation, closed captioning features, and screen format;
   generating a playback preference file containing the determined media playback preference selections by creating a new playback preference file and updating the created playback preference file or by updating a previously created playback preference file;
   determining a stop location for the video content, the stop location corresponding to a resume point for the video content when played on the second media playback device;
   writing the stop location to the generated playback preference file;
   writing the generated playback preference file that includes the stop location to the digital media storage device, without communication over a network, wherein the playback preference selections including the stop location are accessible, after the digital media storage device is removed from the first media playback device, to the second media playback device not communicatively coupled to the first media playback device, and wherein the second media playback device determines whether a playback preference file is present on the digital media storage device and whether the playback preference file includes the stop location, and, if the playback preference file is present and includes the stop location, determines the resume point for playback of the video content and the playback preferences by retrieving the stop location and the playback preferences from the generated playback preference file stored on the digital media storage device.

2. The method of claim 1, wherein the digital media storage device comprises a flash memory storage device.

3. The method of claim 2, wherein the flash memory storage device is a secured digital (SD) flash memory storage device.

4. The method of claim 1, wherein the digital media storage device comprises one of solid state storage device and a hard disk drive.

5. A non-transitory computer readable storage medium storing thereon instructions for configuring a digital media device to resume playback of video content stopped at a first digital media playback device to resume at a second digital media playback device, the instructions, when executed, cause at least one processor to perform a method comprising:
   detecting a stop in play of the video content stored on a writeable, portable digital media storage device;
   determining digital media playback preference selections for the video content played on the first digital media playback device, the first media playback device separate and distinct from the second media playback device, the digital media playback preference selections including at least one of audio language, subtitle presentation, closed captioning features, and screen format;
   generating a playback preference file containing the determined media playback preference selections by creating a new playback preference file and updating the created playback preference file or by updating a previously created playback preference file;
   determining a stop location for the video content, the stop location corresponding to a resume point for the video content when played on the second media playback device;
   writing the stop location to the generated playback preference file;
   writing the generated playback preference file that includes the stop location to the digital media storage device, without communication over a network, wherein the playback preference selections including the stop location are accessible, after the digital media storage device is removed from the first media playback device, to the second media playback device not communicatively coupled to the first media playback device, and wherein the second media playback device determines whether a playback preference file is present on the digital media storage device and whether the playback preference file includes the stop location, and, if the playback preference file is present and includes the stop location, determines the resume point for playback of the video content and the playback preferences by retrieving the stop location and the playback preferences from the generated playback preference file stored on the digital media storage device.

6. The computer readable storage medium of claim 5, wherein the digital media storage device comprises a flash memory storage device.

7. The computer readable storage medium of claim 6, wherein the flash memory storage device is a secured flash memory storage device.

8. The computer readable storage medium of claim 6, wherein the digital media storage device comprises one of solid state storage device and a hard disk drive.

9. A method executable on a first digital media playback device to resume playback of video content from a point at which the video content was stopped on a remote second digital media playback device, the method comprising:
   detecting insertion of a portable and writeable digital media storage device into the first digital media playback device;
   determining presence of a previously generated playback preferences file on the digital media storage device, the previously generated playback preferences file having been recorded on the digital media storage device at a time the video content was stopped on the remote second digital media playback device;

extracting, in response to the determined presence of the previously generated playback preferences file, the playback preferences from the playback preferences file, the playback preferences including at least one of audio language, subtitle presentation, closed captioning features, and screen format;

setting, in response to extracting, playback preferences of the first digital media playback device;

determining presence of a stop point of video content stored within the determined previously generated playback preferences file along with the playback preferences including the at least one of audio language, subtitle presentation, closed captioning features, and screen format on the digital media storage device, the stop point previously stored onto the digital media storage device without communication over a network by the remote second digital media playback device, the remote second digital media playback device separate and distinct from the first digital media playback device and not communicatively coupled to the first digital media playback device; and resuming playback on the digital media playback device, in response to the determined presence of the stop point, of the video content stored within the determined previously generated playback preferences file on the digital media storage beginning at the stop point previously stored by the remote second digital media playback device.

10. The method of claim 9, wherein the digital media storage device comprises a flash memory storage device.

11. The method of claim 10, wherein the playback preferences file and the stop point are stored within a playback file.

12. The method of claim 9, wherein the digital media storage device comprises one of solid state storage device and a hard disk drive.

13. A non-transitory computer readable storage medium storing thereon instructions for resuming playback of video content from a point at which the video content was stopped on a remote second digital media playback device, the instructions when executed on a first digital media playback device cause at least one processor to perform a method comprising:

detecting insertion of a portable and writeable digital media storage device into the first digital media playback device;

determining presence of a previously generated playback preferences file on the digital media storage device, the previously generated playback preferences file having been recorded on the digital media storage device at a time the video content was stopped on the remote second digital media playback device;

extracting, in response to the determined presence of the previously generated playback preferences file, the playback preferences from the playback preferences file, the playback preferences including at least one of audio language, subtitle presentation, closed captioning features, and screen format;

setting, in response to extracting, playback preferences of the first digital media playback device;

determining presence of a stop point of video content stored within the determined previously generated playback preferences file along with the playback preferences including the at least one of audio language, subtitle presentation, closed captioning features, and screen format on the digital media storage device, the stop point previously stored onto the digital media storage device without communication over a network by the remote second digital media playback device, the remote second digital media playback device separate and distinct from the first digital media playback device and not communicatively coupled to the first digital media playback device; and resuming playback on the digital media playback device, in response to the determined presence of the stop point, of the video content stored within the previously generated determined playback preferences file on the digital media storage beginning at the stop point previously stored by the remote second digital media playback device.

14. The computer readable storage medium of claim 13, wherein the digital media storage device comprises a flash memory storage device.

15. The computer readable storage medium of claim 14, wherein the playback preferences file and the stop point are stored within a playback file.

16. The computer readable storage medium of claim 13, wherein the digital media storage device comprises one of solid state storage device and a hard disk drive.

* * * * *